United States Patent
Yokouchi (10) Patent No.: US 7,519,620 B2
(45) Date of Patent: Apr. 14, 2009

(54) REPLICATION SYSTEM, METHOD AND PROGRAM FOR REPLICATING A PLURALITY OF DATABASES INTO A REPLICA DATABASE

(75) Inventor: Hiroshi Yokouchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 222 days.

(21) Appl. No.: 10/785,990

(22) Filed: Feb. 26, 2004

(65) Prior Publication Data
US 2004/0167936 A1 Aug. 26, 2004

Related U.S. Application Data

(63) Continuation of application No. 09/809,257, filed on Mar. 16, 2001, now abandoned.

(30) Foreign Application Priority Data
Sep. 27, 2000 (JP) .............................. 2000-294551

(51) Int. Cl.
*G06F 17/30* (2006.01)
(52) U.S. Cl. .............................. 707/200; 707/2; 707/4; 707/100; 707/102
(58) Field of Classification Search ................ 707/1–7, 707/100, 104.1, 200, 102; 709/203, 220–221
See application file for complete search history.

(56) References Cited

U.S. PATENT DOCUMENTS 5,261,092 A * 11/1993 McLaughlin et al. ........ 713/375
5,333,265 A * 7/1994 Orimo et al. ................. 707/201
5,553,279 A * 9/1996 Goldring ...................... 707/201
5,745,753 A * 4/1998 Mosher, Jr. .................. 707/202
5,757,669 A * 5/1998 Christie et al. .............. 709/205
5,758,337 A * 5/1998 Hammond ...................... 707/6

(Continued)

FOREIGN PATENT DOCUMENTS

EP 0445823 * 3/1991 ..................... 9/44

(Continued)

OTHER PUBLICATIONS

Williamson,DA, "database replication in a high up-time environment", proceedings, IEEE aerospace applications conference, 1996, vol. 3, pp. 337-346.*

(Continued)

*Primary Examiner*—Khanh B Pham
(74) *Attorney, Agent, or Firm*—Mattingly, Stanger, Malur & Brundidge, P.C.

(57) ABSTRACT

Data of a plurality of master tables can be replicated in one replica table. A job to access a plurality of tables can be executed by accessing one replica table, and hence the job execution time is minimized. A correspondence is established between data using, as a key, particular data in the data of a plurality of master tables. The data field for the key is defined by the replication definition. Timing of replication for the replica table is also defined in the program to execute replication. The replication program generates, at execution thereof, the control table according to the definition and manages the operation states of a plurality of master tables and the replication state of the replica table to thereby conduct replication for the replica table at the defined timing.

9 Claims, 6 Drawing Sheets

U.S. PATENT DOCUMENTS

| | | | | |
|---|---|---|---|---|
| 5,806,075 | A * | 9/1998 | Jain et al. | 707/201 |
| 5,870,761 | A * | 2/1999 | Demers et al. | 707/201 |
| 5,870,765 | A * | 2/1999 | Bauer et al. | 707/203 |
| 5,873,074 | A * | 2/1999 | Kashyap et al. | 707/2 |
| 5,884,324 | A * | 3/1999 | Cheng et al. | 707/201 |
| 5,937,415 | A * | 8/1999 | Sheffield et al. | 707/204 |
| 6,101,494 | A | 8/2000 | Khosravi-Sichani et al. | |
| 6,112,209 | A * | 8/2000 | Gusack | 707/101 |
| 6,202,070 | B1 | 3/2001 | Nguyen et al. | |
| 6,457,007 | B1 | 9/2002 | Kikuchi et al. | |
| 6,532,479 | B2 * | 3/2003 | Souder et al. | 707/201 |
| 6,567,823 | B1 * | 5/2003 | Rothschild | 707/104.1 |
| 6,622,152 | B1 * | 9/2003 | Sinn et al. | 707/204 |
| 6,625,593 | B1 * | 9/2003 | Leung et al. | 707/2 |
| 6,745,209 | B2 * | 6/2004 | Holenstein et al. | 707/203 |

FOREIGN PATENT DOCUMENTS

| | | | | |
|---|---|---|---|---|
| EP | 0745238 | * | 2/1995 | |
| JP | 2000-20374 | | 1/2000 | |
| WO | WO9908209 | * | 2/1999 | 17/30 |

OTHER PUBLICATIONS

Matthias Wiesmann, et al. "understanding replication in databaes and distributed systems", , 2000.*

Khuzaima Daudjee et al. "lazy database replication with ordering guarantees", proceedings of the 20th internatinal conference on daa engineering, 2004.*

M.Wiesmann et al. "understanding replication in databases and distributed systems", 2000.*

* cited by examiner

| TABLE NAME: MASTER TABLE NAME | OPERATION TYPE: MASTER TABLE OPERATION CONTENTS INSERTION/UPDATE /DELETION | TABLE DATA: MASTER TABLE DATA OPERATED |
|---|---|---|
| 201 | 202 | 203 |

FIG. 4

400 — TABLE NAME OF REPLICA TABLE

402 — TABLE NAME OF JOINING MASTER TABLE

403 — JOINING KEY FOR MATCHING OF A PLURALITY OF JOINING MASTER TABLES

404 — REPLICATION TIMING

405 — TABLE NAME OF JOINING MASTER TABLE

406 — INSUFFICIENT DATA SETTING VALUE

407 —

| JOINING KEY | OPERATION INFORMATION STATE | REPLICATION STATE |
|---|---|---|
| 408 | 409 | 410 |

} REPEATED IF NECESSARY

FIG. 3

| DEFINITION NAME | SPECIFICATION CONTENTS |
|---|---|
| JOINING TABLE DEFINITION | SPECIFY A REPLICATION SOURCE TABLE NAME FOR JOINING AND A NAME OF REPLICATION TABLE FOR REPLICATION |
| JOINING KEY DEFINITION | SPECIFY REPLICATION SOURCE TABLE COLUMN NAME AS A KEY FOR JOINING |
| REPLICATION TIMING DEFINITION | (INSERTION)<br>303 — ① INSERT DATA IN REPLICA TABLE WHEN ALL DATA IS SET TO A PLURALITY OF REPLICATION SOURCE TABLES FOR JOINING<br>304 — ② INSERT DATA IN REPLICA TABLE WHEN DATA IS SET TO PRIMARY TABLES (JOINING MASTER) AMONG A PLURALITY OF REPLICATION SOURCE TABLES FOR JOINING<br>305 — ③ INSERT DATA IN REPLICA TABLE WHEN DATA IS SET TO EITHER ONE OF A PLURALITY OF REPLICATION SOURCE TABLES FOR JOINING<br>(DELETION)<br>306 — ① DELETE PERTINENT DATA FROM REPLICA TABLE WHEN PERTINENT INFORMATION OF A PLURALITY OF REPLICATION SOURCE TABLES FOR JOINING IS ENTIRELY DELETED<br>307 — ② DELETE PERTINENT DATA FROM REPLICA TABLE WHEN PRIMARY TABLES (JOINING MASTER) AMONG A PLURALITY OF REPLICATION SOURCE TABLES FOR JOINING ARE DELETED<br>308 — ③ FOR EACH DATA DELETION OF A PLURALITY OF REPLICATION SOURCE TABLES FOR JOINING, REPLACE PERTINENT DATA IN REPLICA TABLE WITH INSUFFICIENT DATA SETTING VALUE AND DELETE PERTINENT DATA FROM REPLICA TABLE WHEN DATA OF PERTINENT DATA IS ENTIRELY DELETED FROM A PLURALITY OF REPLICATION SOURCE TABLES FOR JOINING<br>309 — ④ DELETE PERTINENT DATA FROM REPLICA TABLE WHEN EITHER ONE OF THE DATA ITEMS OF A PLURALITY OF REPLICATION SOURCE TABLES FOR JOINING IS DELETED |
| JOINING MASTER DEFINITION | WHEN ② IS SPECIFIED FOR INSERTION/DELETION AT REPLICATION TIMING DEFINITION, SPECIFY TABLE NAME OF REPLICATION SOURCE TABLE AS JOINING MASTER FOR EACH INSERTION/DELETION |
| INSUFFICIENT DATA DEFINITION | WHEN ②/③ IS SPECIFIED FOR INSERTION AND DELETION AT REPLICATION TIMING DEFINITION, WHEN DATA IS NOT INSERTED IN REPLICATION SOURCE TABLE WITHIN A PLURALITY OF REPLICATION SOURCE TABLES, OR WHEN "DELETION" IS SPECIFIED, DEFINE DATA TO BE SET TO REPLICA TABLE |
| INPUT MEDIUM DEFINITION | |
| INPUT CHANGE TIMING DEFINITION | SELECT TIMING FROM ITEMS BELOW TO CHANGE INPUT MEDIUM<br>① CHANGE FOR EACH INPUT OF OPERATION INFORMATION<br>② CHANGE WHEN NEXT OPERATION INFORMATION IS ABSENT |

REPLICATION SYSTEM, METHOD AND PROGRAM FOR REPLICATING A PLURALITY OF DATABASES INTO A REPLICA DATABASE

This is a continuation application of U.S. Ser. No. 09/809,257, is now abandoned filed Mar. 16, 2001.

BACKGROUND OF THE INVENTION

The present invention relates to a replication system, and in particular, to a replication system in which data of a plurality of master tables of a database is replicated in one replica table.

Known replication techniques include, for example, a technique described in JP-A-2000-20374. This prior art relates to a replication system in which when a master table is operated, for example, by transaction processing, replication is automatically conducted for a replica table. Each replica table has one master table in the replication system. According to the technique of the prior art, in a case where a job using the replica system requires data divided into sub-data and controlled using a plurality of tables, when the job is executed, it is necessary to access the tables to refer to sub-data and/or to update sub/data or it is necessary to link the tables with each other by using a database management system (DBMS) of the replica system. Therefore, the job of the replica system takes quite a long period of time.

SUMMARY OF THE INVENTION

In the prior art technology described above, when data divided and stored in the tables for management thereof is required, it is necessary to join the tables with each other. This results in a problem of a long period of time to execute the job of the replica system. The problem can be solved by replicating, in the replication of data of a plurality of master tables, the data in one replica table.

However, to replicate data of a plurality of master tables in one replica table, it is required to solve the following problems. First, timing of replication must be determined, that is, how to allocate data of a plurality of master tables to the replication in one replica table; which one of the master tables is associated with the replication; or, whether or not replication is conducted after operations of all master tables. Second, it is necessary to determine how to process data of the master tables not operated at replication. These issues have attended with a problem that these issues vary depending on data to be replicated and a job of the replica system.

It is therefore an object of the present invention to provide a replication system which solves the problems in the replication replicating data of a plurality of master tables in one replica table and which minimizes the job execution time of the replica system.

To achieve the above object, according to an aspect of the present invention, there is provided a replication system in which according to operation information of addition, update, and deletion in a plurality of master tables associated with a database, one replica table is generated using a plurality of master tables. Replication is conducted such that data items of the master tables are joined with each other by establishing a matching state by use of particular data in the master tables as a joining key to thereby generate one replica table. In the replication system, at data insertion or data deletion of all said master tables or at data insertion or data deletion of either one of said master tables, particular timing is selected from a plurality of timing to conduct a predetermined replication to thereby conduct the replication.

In accordance with the above-mentioned configurations of the present invention, it is possible to define data for which a correspondence is established to a replication program to conduct replication, timing of the replication, and data to be set to a replica table in non-operative state of a pertinent master table. According to the definitions, the user can arbitrarily carry out replication.

BRIEF DESCRIPTION OF THE DRAWINGS

Other objects, features and advantages of the present invention will be more apparent from the following detailed description of the embodiments of the invention when taken in conjunction with the accompanying drawings, in which:

FIG. 3 is a table showing an example of a replication definition in a replication program;

DESCRIPTION OF THE EMBODIMENTS

Referring now the accompanying drawings, description will be given of embodiments of a replication system in accordance with the present invention.

Figure 1:
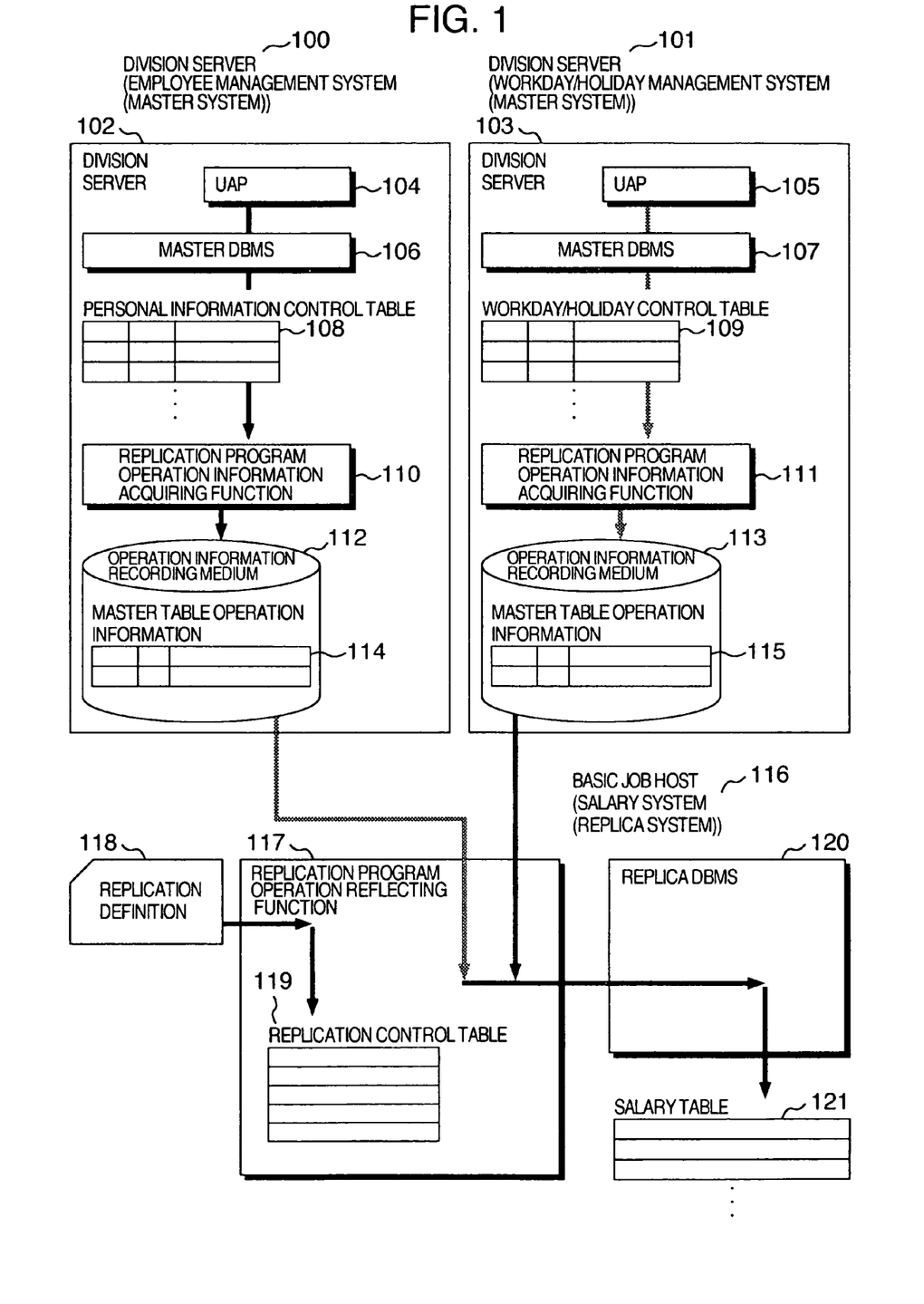
FIG. 1 is a block diagram showing constitution of an embodiment of a replication system according to the present invention.

FIG. 1 shows structure of an embodiment of a replication system according to the present invention in a block diagram. The configuration of FIG. 1 includes master systems 100 and 101, division servers 102 and 103, job application programs 104 and 105, database management systems 106 and 107, master tables 108 and 109, replication program operation information acquiring functions 110 and 111, operation information storages 112 and 113, master table operation information 114 and 115, a basic job host (replica system) 116, a replication program operation information reflecting function 117, replication definition information 118, a replication control table 119, a replica database management system (DBMS) 120, and a replica table 121.

The embodiment of a replication system shown in FIG. 1 according to the present invention is applied to a salary calculation system by way of example. The salary calculation system includes master systems 100 and 101 respectively including firm division servers 102 and 103 to control the master tables 108 and 109, the replica DBMS 120 constituting the job host 116 of a salary system which manages the replica table 121 to execute monthly processing, and the replication program operation information reflecting function 117 including the replication definition information 118 defining a replication source table name and a replication destination table name and the like for replication.

In the embodiment of a replication system of FIG. 1 according to the present invention, the division server 102 of the employee management system to control the personal information control table (master table) 108 as a replication source and the division server 103 of the workday/holiday management system to control the workday/holiday control table (master table) 109 as a replication source respectively serve as replication source systems. The division servers 102 and 103 respectively include user job application programs (UAP) to execute master table requests according to jobs, the master database management systems (master DBMS) 106 and 107 to respectively control and operate the master tables 108 and 109, the operation information recording media 112 and 123 to respectively record master table operation information 114 and 115, and the replication program operation information acquiring functions 110 and 111 to acquire information of master table operations.

It is also possible that when it is detected that the contents of the master tables 108 and 109 are respectively accessed for operation (change, addition, deletion, etc. of data) from the master DBMS 106 and 107, the replication program operation information acquiring functions 110 and 111 write table names associated with the operations, contents of the operations, and the like in files of the master table operation information 114 and 115, respectively. It is also possible that the replication program operation information acquiring functions 110 and 111 respectively access the master tables 108 and 109 at a fixed interval of time to determine whether or not the master tables 108 and 109 have been changed. According to results of the determination, the replication program operation information acquiring functions 110 and 111 may write table names associated with the operations, contents of the operations, and the like in files of the master table operation information 114 and 115, respectively.

Additionally, the replication program operation information reflecting function 117 includes a replication defining section 118 to define items such as a name of a replication source table and a name of a replication destination table, which will be described later. The replica DBMS 120 is a salary system to control and to operate the salary table (replica table) 121.

Figure 2:
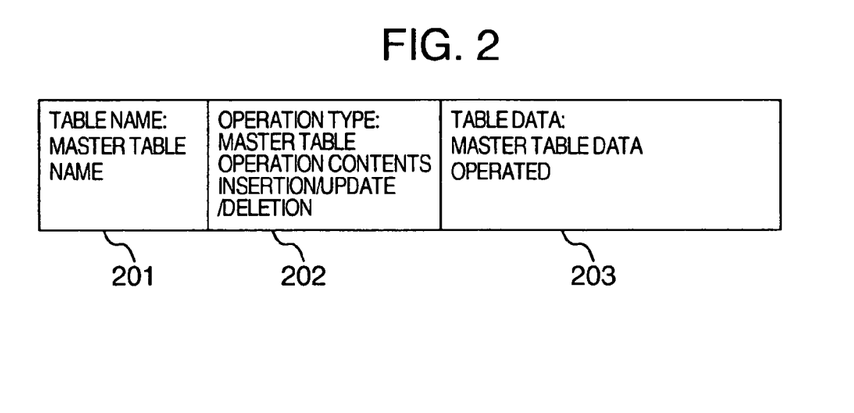
FIG. 2 is a table showing an example of a data layout of master table operation information.

Referring next to FIG. 2, description will be given of structure of the master table operation information 114 and 115.

The master table operation information includes a table name 201 of a master table operated, an operation type 202 of "insertion", "update", or "deletion" executed for the master table, and table data 203 of a master table for which one of the operations "insertion", "update", or "deletion" is conducted as shown in FIG. 2.

Referring next to FIG. 3, description will be given of the replication definition for the replication program operation information reflecting function 117.

The replication definition includes a joining table definition 300 to define table names of joining master tables 108 and 109 and a name of a replica table 121, a joining key definition 301 to define a data field as a key in master table data for a matching to join data items of a plurality of tables with each other, a replication timing definition 302 to define timing to replicate operation information 114 and 115 respectively of the joining master tables 108 and 109 in the replica table 121, a joining master definition 310 to define a table name of a master table as a joining master in a case in which definitions 304 and 307 in the replication timing definition 302 are specified such that either one of a plurality of replication source tables is assigned as a master (joining master) and replication is conducted in the replica table 121 according to information of operation of the joining master table, an insufficient data definition 311 to define data to be set to the replica table in place of data of a master table having no operation information at this point of time in a case in which in the replication timing definition 302, definitions 304, 305, 307, and 308 are specified, namely, a definition other than the definition in which the replica table is operated when operation information of all joining tables is prepared is specified; an input medium definition 312 to specify an operation information recording medium to record information of operation of the master tables 108 and 109, and an input change timing definition 313 to specify an input order when a plurality of operation information recording media exist in the system.

The replication timing definition 302 defines, for data insertion, ① to insert data in the replica table when all data is set to a plurality of replication source tables for joining (303), ② to insert data in the replica table when data is set to primary tables (joining master) among a plurality of replication source tables for joining (304), or ③ to insert data in the replica table when data is set to either one of a plurality of replication source tables for joining (305).

Moreover, for data deletion, the replication timing definition 302 defines ① to delete pertinent data from the replica table when pertinent information of a plurality of replication source tables for joining is entirely deleted (306), ② to delete pertinent data from the replica table when primary tables (joining master) among a plurality of replication source tables for joining are deleted (307), ③ to replace, for each data deletion of a plurality of replication source tables for joining, pertinent data from the replica table with insufficient data setting value and to delete pertinent data from the replica table when data of pertinent data is entirely deleted from a plurality of replication source tables for joining (308), or ④ to delete pertinent data from the replica table when either one of the data items of a plurality of replication source tables for joining is deleted (309). Moreover, the input change timing definition 313 defines ① to change the input for each input of operation information or ② to change the input when next operation information is absent. (Whether or not "all data of a plurality of replication source tables for joining is inserted" of the data insertion ① (303) is determined using the replication control information 407 stored in the replication control table shown in FIG. 4. This also applies to the replication timing definitions 304 to 309. Which one of the operations has been conducted in which one of the tables is determined using the replication control information 407 stored in the replication control table. The replication control table will be described later.)

Figure 4:
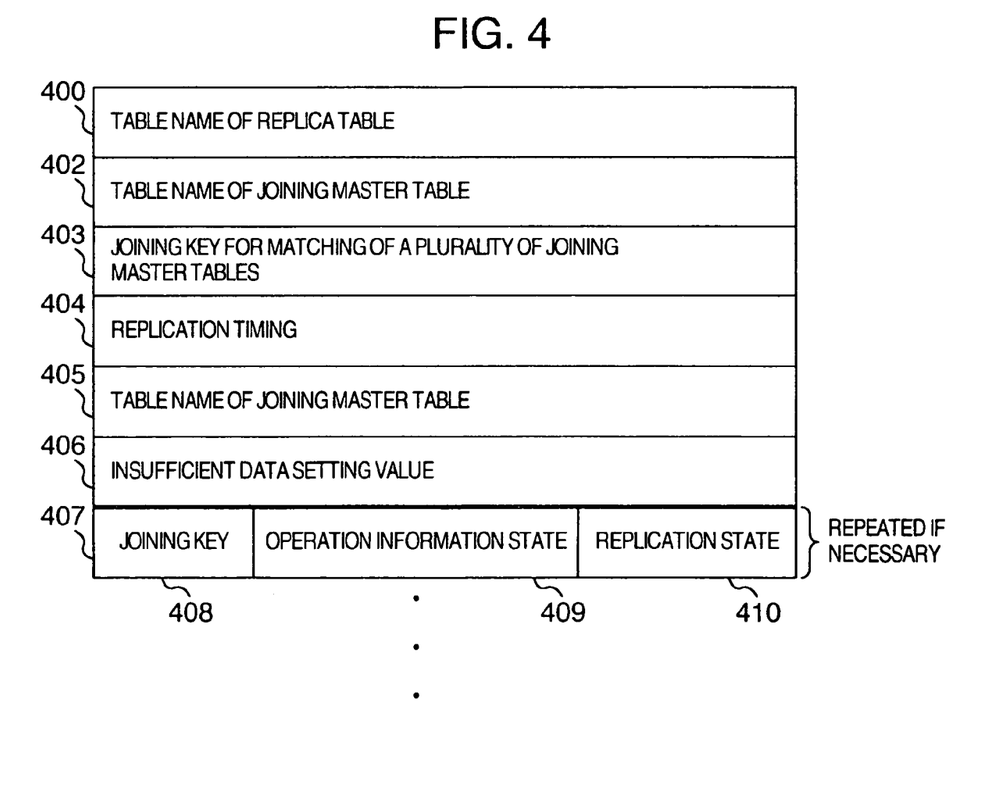
FIG. 4 is a table showing an example of a table indicating replication control tables used to control replication.

Referring now to FIG. 4, description will be given of a layout of the replication control table 119 generated by the replication program operation information reflecting function 117 according to the replication definition at execution of the replication program operation information reflecting function 117.

The replication control table 119 is a control table to join data of a plurality of master tables with each other to control replication of data in one replica table.

The replication control table 119 includes a table name 400 of a replica table defined in the replication definition, a table name 402 of a joining master table, a joining key 403 which is information for the matching of a plurality of joining master tables, for example, a joining key of a personal identifier number; replication timing 404, a table 405 of a joining master table, an insufficient data setting value 406, and replication control information 407.

By analyzing the contents of files of the master table operation information 114 and 115, the system stores in the replication control information 407 master table operation information for each joining key 408 contained in the table data 203.

For example, as a result of analysis of the file contents, information of master table operation may be stored as follows. The replication program operation information reflecting function 117 accesses the master table operation information 114 and 115 at a fixed interval of time to determine presence or absence of any information item of the master table operation information 114 and 115 not stored in the replication control information 407. If such an information item is found, information items such as a joining key and an operation state are extracted from the information item to store the extracted information items in the replication control information 407 for each joining key.

The replication control information 407 includes a master table operation information state 409 indicating an operation state of each of the master tables, namely, "insert" to indicate that data of the joining key value is inserted to the master table, "no operation information" to indicate that nor information exists for operation, or "–" to indicate "deletion" and a replication state 410 indicating a replication state in the replica table, namely, "insert" to indicate that data of the pertinent joining key value is inserted in the replica table or "–" to indicate that the data is not inserted therein yet. (That is, the information stored in the replication control information 407 indicates the operation and the master table for which operation is conducted with the data corresponding to the joining key. According to the information, the replication program operation information reflecting function 117 determines operation to be conducted for the replica system.)

For the replication program 117 to acquire the operation state of each master table, it is necessary to read (or to receive via communication) the operation information 114 and 115 stored in the operation information recording media 112 and 113, respectively.

Various methods may be used for this purpose. For example, the replication program 117 may be specified to read the operation information 114 and 115 at a fixed interval of time. Or, it is also possible that a file manager program to control files of the operation information 114 and 115 is activated on a computer connected to the operation information recording media 112 and 113. The file manager program refers to the files of the operation information 114 and 115 at a fixed period of time to transmit data of updated sections of the files to the replication program 117. The replication program 117 accordingly updates the contents of the replication control table or reflects the data in the replica system. It is also possible that, each time the master table is operated in each master system, the condition is notified to the replication program operation information reflecting function 117.

In the system of FIG. 1, when the master tables, i.e., the personal information management table 108 and the workday/holiday management table 109 are operated by requests respectively from the job applications 104 and 105, the replication program operation information acquiring functions 110 and 111 respectively obtain master table operation information 114 and 115 and then record the information 114 and 115 on the operation information recording media 112 and 113, respectively.

On the other hand, the replication program operation information reflecting function 117 analyzes, at execution of processing of the function 117, the replication definition 118 and develops the definition 118 in the replication control table 119 (the function 117 reads the replication definition 117, extracts therefrom information necessary for the table 119, and then stores the extracted information in the table 119.) Thereafter, the function 117 reads the operation information 114 and 115 of the master tables 108 and 109 recorded respectively on the operation information recording media 112 and 113, analyzes the information 114 and 115, and registers a value to the pertinent joining key value 408 of the replication control table 119.

The replication program operation information reflecting function 117 then makes a condition check according to the replication timing 404 and the control state of the replication control information 407 in the replication control table 119, joins when necessary the operation information 114 of the master table 108 with the operation information 115 of the master table 109, and issues an operation request of the replica table 121 to the replica DBMS 120.

Referring now to the data flow shown in FIG. 5 and the flowchart of FIG. 6, description will be given of operation of the replication program operation information reflecting function 117 in the embodiment of a replication system configured as above in accordance with the present invention. In the description of this example, it is assumed that processing is executed, beginning at timing of execution of a UAP, by receiving the operation information 510 of the personal information management table, operation information 511 and 512 of the workday/holiday management system, and the operation information 513 of the personal information management table in this order from the operation information recording media.

(1) When the replication program operation information reflecting function 117 is executed, the function 117 first analyzes the replication definition 118 to develop necessary information in the replication control table 119 (step 600).

Figure 5:
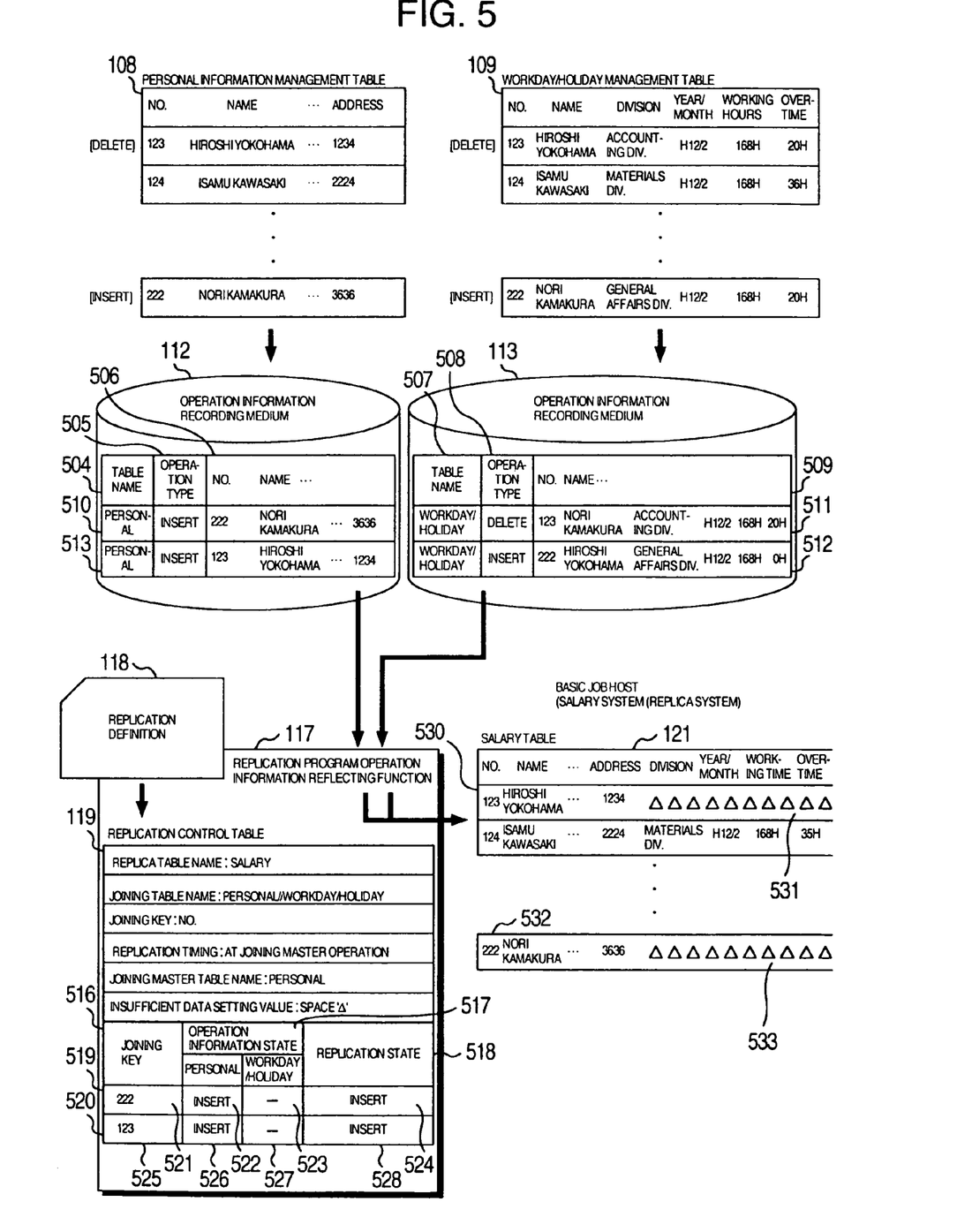
FIG. 5 is a diagram showing an example of a flow of data.
Figure 6:
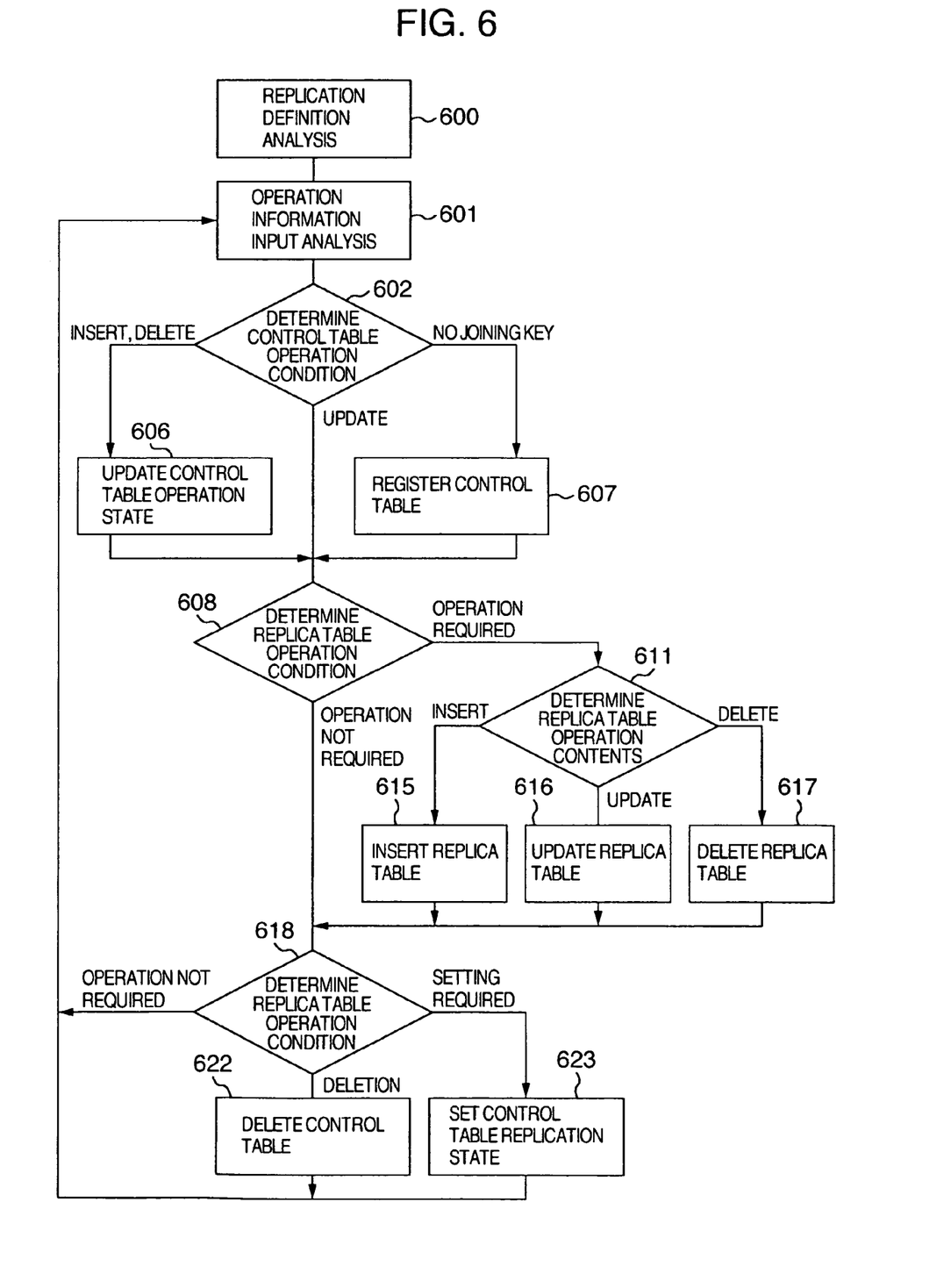
FIG. 6 is a flowchart showing an example of operation for replication in a replica table.

FIG. 5 shows an example in which analysis results of the replication definition 118 are reflected in the replication control table 119. (The replica table name is set as "salary", the joining table name is set as "personal//workday/holiday", the joining key is set as "number", the replication timing is set as "at joining master operation", the joining master table name is set as "personal", and an insufficient data setting value is set as space 'Δ'. That is, in accordance with the setting operation, the joining tables (the replication source tables of the master system) are "personal table" and "workday/holiday table", the replica table (the replica system table) is "salary table", data as a key to join data from the replication source table is "number", the replication timing is "when an operation is conducted in the joining master table", the joining master table name is "personal table", and the insufficient data setting value is "space 'Δ'".)

The system manager may beforehand prepare and stores the replication definition 118 in a recording medium which can be accessed by the replication program. It is also possible to provide a function in which a plurality of replication definitions are beforehand stored in a storage with identifiers assigned to the respective definitions such that the replication program selects a necessary one of the definition using the identifier.

(2) The function 117 then inputs the operation information 510 to 513 of the master table 108 and 109 from the operation information recording media 112 and 113 (the function 117 accesses the media 112 and 113 to read information 510 to 513 from the master tables 108 and 109). The function 117 analyzes the master table names 504 and 507, the operation types 505 and 508, and the joining keys 506 and 509 (step 601).

(3) A condition check is conducted according to presence or absence of registration of the operation types 505 and 508 of the operation information 510 to 513 and the joining key 516 of the operation information 510 to 513 in the replication control table 119 (step 602).

(4) In the check in step 602, if the joining key 516 of the information 510 to 513 in the table 119 is absent, the joining keys 521 and 535 of the operation information 510 to 513 and the operation information state 517 are registered to the replication control table 119 (step 607). (For example, the joining key "222" and the operation type "insert" are extracted from the operation information 510 and are then stored in the pertinent places of the table. Since the table name of the operation information 510 is "personal", the operation type "insert" is stored in a place 522 corresponding to the joining key "222" in the column of "personal" in the operation information state 517.

(5) In the check in step 602, if the operation types 505 and 508 are "insert" or "delete" and the joining key 516 of the pertinent operation information in the replication control table 119 is present, the operation information state 517 of the replication control table 119 is updated (step 606).

(6) In the check in step 602, if the operation types 505 and 508 are "update", no operation is conducted for the replication control table 119.

For the operation above, description will be given of operation corresponding to each operation information shown in FIG. 5.

At input of the operation information 510, since the joining key 521 is absent in the replication control table 119, "insert" is set to the joining key 521 and the operation information state 522 in the personal information management table. (Since the joining key is defined as "joining key: number" in the replication control table 119, the replication program operation information reflecting function 117 extracts the number "222" from the data of the operation information 510 in the master table operation information 114 and then stores "222" as the joining key value in the field 521. The function 117 extracts the operation type "insert" from the data of the operation information 510. The extracted information "insert" is stored in the field 522 in association with the joining key "222" and the table name "personal" as the operation object of the operation information 510.)

Also in a case to reflect the contents of the operation information 511 in the replication control table, the joining key is set to the field 525 since the value "123" of the joining key corresponding to the operation information 511 is absent in the replication control table 119.

However, since the operation type of the operation information 511 is "delete", "insert" is set to the operation information state 526 in the personal information management table and "−" and "insert" are respectively set to the operation information state 527 and the replication state 528 of the workday/holiday management table. (In this example, since the replication timing is "at joining master table operation" and the joining master table is "personal information management table", the replication timing is associated with operation of the joining master table.) Moreover, at input of the operation information 512, since the replication control table 119 includes the joining key 521, only "insert" is set to the operation information state 523 of the workday/holiday table. At input of the operation information 513, since the replication control table 119 includes the joining key 525 and the operation type of the operation information 513 is "delete", the operation information state 526 of the personal information management table set to "insert" in association with the workday/holiday management table control information 511 is changed to "−".

(7) A condition check is made for the operation types 505 and 508 of the operation information 510 to 513, the definition of the replication timing definition 302, and the operation information state 517 of the replication control table (steps 608 and 611).

(8) As a result of the check in steps 608 and 611, if the operation types 505 and 508 are "insert" and the operation information state 517 of the replication control table 119 satisfies the condition specified by the replication timing definition 302, the data 532 is inserted in the replica table 121. In this situation, if there exists insufficient data, data ("space" in this example) specified in the insufficient data definition 311 of the replication definition is set (533) to be inserted in the replica table 121 (step 615).

(9) As a result of the check in steps 608 and 611, if the operation types 505 and 508 are "delete", the contents of operation of the replica table 121 vary depending on the specification of the replication timing definition 302 and the operation information state 517 of the replication control table 119. If the operation information state 517 of the table 119 satisfies the specification of the replication timing definition 302, data 530 is deleted from the replica table 121 (step 617).

(10) As a result of the check in steps 608 and 611, if the condition is not satisfied, the pertinent data 531 of the replica table 121 is updated, according to the specification of the replication timing definition 302, using data ("space" in this example) specified in the insufficient data definition 311 of the replication definition. If the operation types 505 and 508 are "update" and the replication state 518 of the replication control table 119 is "insert", the pertinent data of the replica table 121 is updated using data of the operation information (step 616).

(11) In other than the cases above, the process goes to the subsequent step without conducting operation for the replica table 529.

For the operation described above, description will be given of operation in the operation information processing shown in FIG. 5 for each definition of the replication definition 302 shown in FIG. 3.

When the definition of "insert" of the replication timing definition 302 is "①Insert data in replica table when all data is set to a plurality of replication source tables for joining" 303, data of the operation information 510 already set to the replica table 121 at input of the operation information is joined with data of the operation information 512 and insertion of the data 532 is conducted.

When the definition of "insert" of the replication timing definition 302 is "②Insert data in replica table when data is set to primary tables (joining master) among a plurality of replication source tables for joining" 304 and the personal information management table 108 is a joining master, "space" is set to the data field 533 of the operation information 512 in the replica table 121 at input of the operation information 510 to thereby conduct insertion of the data 532. Thereafter, at input of the operation information 512, the data field 533 of the operation information 512 of the data 532 already inserted is updated using data of the operation information 512. When the joining master is the workday/holiday management table 109, the operation is conducted in the same way as in the case in which the "insert" definition of the replication timing definition 302 is "①Insert data in replica table when all data is set to a plurality of replication source tables for joining" 303.

When the definition of "insert" of the replication timing definition 302 is "③Insert data in replica table when data is set to either one of a plurality of replication source tables for joining" 305, the operation is conducted in the same way as in the case in which the definition of "insert" of the replication timing definition 302 is "②insert data in replica table when data is set to primary tables (joining master) among a plurality of replication source tables for joining" 304 and the joining master is the personal information management table 108.

When the definition of "delete" of the replication timing definition 302 is "①Delete pertinent data from replica table when pertinent information of a plurality of replication source tables for joining is entirely deleted" 306, the data 530 is deleted from the replica table 121 at input of the operation information 513.

When the definition of "delete" of the replication timing definition 302 is "② Delete pertinent data from replica table when primary tables (joining master) among a plurality of replication source tables for joining are deleted" 307 and the personal information management table 108 is a joining master, the data field 531 of the operation information 511 in the replica table 121 is updated to "space" at input of the operation information 151. Thereafter, at input of the operation information 513, the data 530 is deleted. When the joining master is the workday/holiday management table 109, the data 530 is deleted at input of the operation 511. At input of the operation information 513, operation is not conducted for the replica table 121.

When the definition of "delete" of the replication timing definition 302 is "③ For each data deletion of a plurality of replication source tables for joining, replace pertinent data in replica table with insufficient data setting value and delete pertinent data from replica table when data of pertinent data is entirely deleted from a plurality of replication source tables for joining" 308, operation is conducted in the same way as in the case in which the definition of "delete" of the replication timing definition 302 is "② Delete pertinent data from replica table when primary tables (joining master) among a plurality of replication source tables for joining are deleted" 307 and the personal information management table 108 is a joining master.

When the definition of "delete" of the replication timing definition 302 is "④ Delete pertinent data from replica table when either one of the data items of a plurality of replication source tables for joining is deleted" 309, operation is conducted in the same way as in the case in which the definition of "delete" of the replication timing definition 302 is "② Delete pertinent data from replica table when primary tables (joining master) among a plurality of replication source tables for joining are deleted" 307 and the joining master is the workday/holiday management table 109.

(12) Finally, a condition check is made for the operation contents of the replica table 121 to determine control table operation conditions. If data insertion 532 has been conducted for the replica table 121, "insert" is set to the replication state 524 of the replication control table 119. If replica table deletion 530 has been conducted, the pertinent joining key 520 is deleted (initialized) in the replication control table 119. Process then returns to step 601 to start operation for subsequent operation information (steps 618, 623, and 622).

In accordance with the embodiment of the present invention described above, when the personal information management table is joined with the workday/holiday management table, replication can be achieved for the salary table as a replica table. Consequently, the month processing executed heretofore by accessing the personal information management table and the workday/holiday management table can be carried out by accessing one salary table. This minimizes the period of time required for the job execution.

Additionally, in accordance with the embodiment of the present invention described above, when an application system in which replication is conducted for a plurality of tables for each master table is changed to a system using only one replica table, maintenance of the replica table is considerably minimized.

Furthermore, by managing operation information of a plurality of master tables using a replication control table, the contents of a plurality of master tables can be reflected in a replica table according to the replication timing definition.

As described above, replication can be conducted from a plurality of master tables to one replica table, and a job in which a plurality of tables are accessed can be changed to a job which can be executed by accessing only one replica table. Therefore, the period of time required for the job execution can be reduced. A correspondence is established between particular data in the data of a plurality of master tables and keys (joining keys). The data field for a key is defined by the replication definition 118. Timing of replication for the replica table 121 is also defined in the program 117 to execute replication. The replication program 117 generates, at execution thereof, the control table 119 according to the definition 118 and manages the operation states of a plurality of master tables 108 and 109 and the replication state of the replica table to thereby conduct replication for the replica table 121 at the defined timing.

Figure 7:
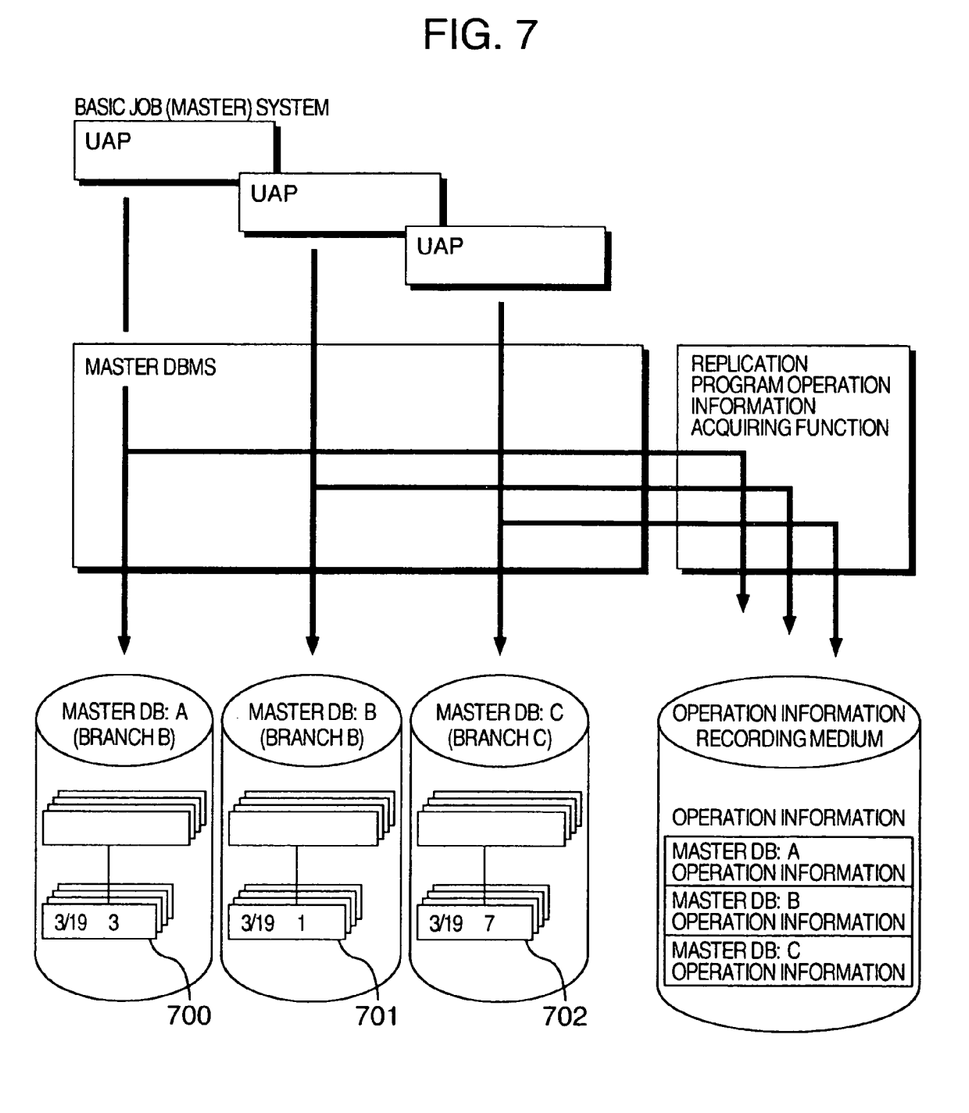
FIG. 7 is a block diagram showing a configuration of another embodiment of a replication system according to the present invention.

FIG. 7 shows in a block diagram a configuration of another embodiment of a replication system in accordance with the present invention. The configuration of FIG. 7 includes a hierarchic databases 700 to 702.

In the embodiment of a replication system according to the present invention, the present invention is applied to a hierarchic databases 700 to 702 which is a database of a master system. That is, in place of the master tables 108 and 109 of FIG. 1, a plurality of hierarchic databases 700, 701, and 702 are employed as replication sources. Also in this construction, like in the embodiment above, the period of time required for the job execution can be minimized in a replica system in which data of a plurality of master tables is replicated in one replica table.

In accordance with the present invention described above, data of a plurality of master tables can be replicated in one replica table. Therefore, a job in which a plurality of tables are accessed can be changed to a job in which one replica table is accessed, and hence the job execution time can be remarkably reduced. When a job in which replication is conducted for a plurality of tables for each master table changed to a job in which one replica table is used, the maintenance of the replica table can be also simplified.

The specification and drawings are, accordingly, to be regarded in an illustrative rather than a restrictive sense. It will, however, be evident that various modifications and changes may be made thereto without departing from the broader spirit and scope of the invention as set forth in the claims.

What is claimed is:

1. A method for managing a plurality of master databases and a replica database generated from said plurality of master databases, comprising:

storing, as replication control information, a plurality of names of master tables of the master databases, a name of the replica database generated from said plurality of master databases by join operations based on predetermined joining keys, joining keys used in said join operations, and timing conditions setting timings at which replications of data are performed to the replica database from the master tables to correlate with each other;

in response to reception of a request for a data operation to a record stored in a first one of said master databases, storing as operation information the requested data operation to correlate identification information of an operated record with the master table name of the first master database on which the data operation request has been performed;

determining whether a processing result of the data operation request meets the timing conditions;

when the timing conditions are met, acquiring the master table name of the first master database on which said data operation request has been operated, one of said stored joining keys corresponding to said timing conditions, a second master table name of a second master database, and the replica database name to be joined by the joining key from the replication control information;

referring to said stored operation information to acquire the record subject to data operation, said record belonging to a master table of the first master database on which the data operation has been made based on the data operation request;

performing a joining processing with respect to said record subject to the data operation and said second master database to be joined using said joining key, by referring to the replication control information;

reflecting a replica database record generated by the joining processing to said replica database to implement to said replica database the data operation based on said data operation request; and accessing the replica database in place of accessing the plurality of master databases when executing a job requiring accessing of the plurality of master databases, whereby time required for executing the job is minimized.

2. The method according to claim 1,
wherein said timing conditions include a timing at which inserted data is inserted into all of the plurality of master databases that were used to generate the replica database, and
further including a step of inserting data corresponding to said inserted data into said replica database.

3. The method according to claim 1,
wherein said timing conditions include a timing at which inserted data is inserted into the second master database of the plurality of master databases that were used to generate the replica database, and
further including a step of inserting data corresponding to said inserted data into said replica database.

4. The method according to claim 1,
wherein said timing conditions include a timing at which inserted data is inserted into at least one of the plurality of master databases that were used to generate the replica database, and
further including a step of inserting data corresponding to said inserted data into said replica database.

5. The method according to claim 1,
wherein said timing conditions include a timing at which pertinent data is deleted from one of said plurality of master databases that were used to generate the replica database, and
further including a step of deleting data corresponding to the pertinent data from said replica database.

6. The method according to claim 1,
wherein said timing conditions include a timing at which one of said master tables of said plurality of master databases that were used to generate the replica database is deleted, and
further including a step of deleting data corresponding to the deleted master table from said replica database.

7. The method according to claim 1,
wherein said timing conditions include a timing at which pertinent data is deleted from one master database of said plurality of master databases that were used to generate the replica database, and
further including a step of replacing data corresponding to the pertinent data in said replica database with an insufficient data setting value.

8. The method according to claim 1,
wherein said timing conditions include a timing at which pertinent data is deleted from all of said plurality of master databases that were used to generate the replica database, and
further including a step of deleting data corresponding to the pertinent data from said replica database.

9. The method according to claim 1,
wherein said timing conditions include a timing at which a data item is deleted from one of said plurality of master databases that were used to generate the replica database, and
further including a step of deleting data corresponding to the data item from said replica database.

* * * * *